Figure 1:
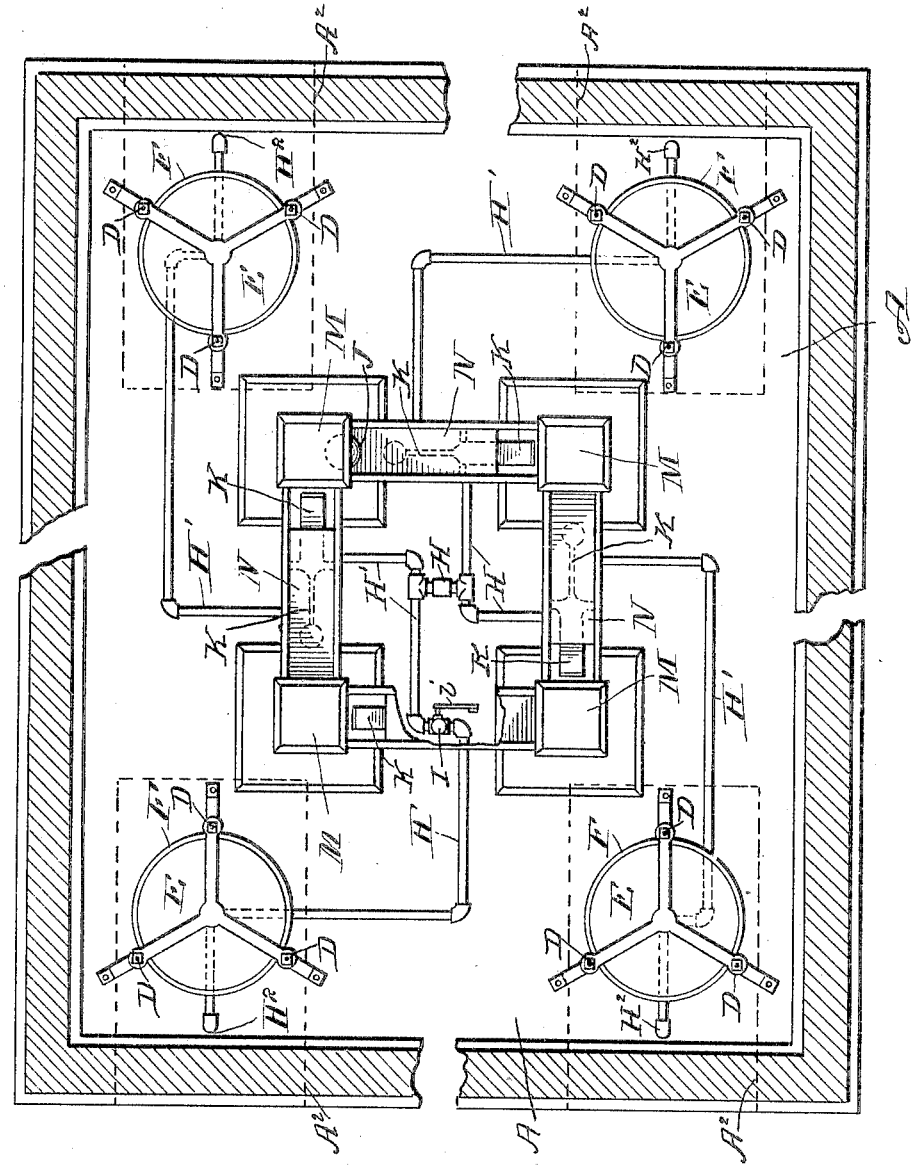

No. 793,963. PATENTED JULY 4, 1905.
W. S. SHIELDS.
LIQUID CONTROLLER.
APPLICATION FILED APR. 5, 1904.

3 SHEETS—SHEET 1.

Witnesses:
H. S. Gaither
H. M. McDowell

Inventor:
William S. Shields
by L. J. Hopkins
atty.

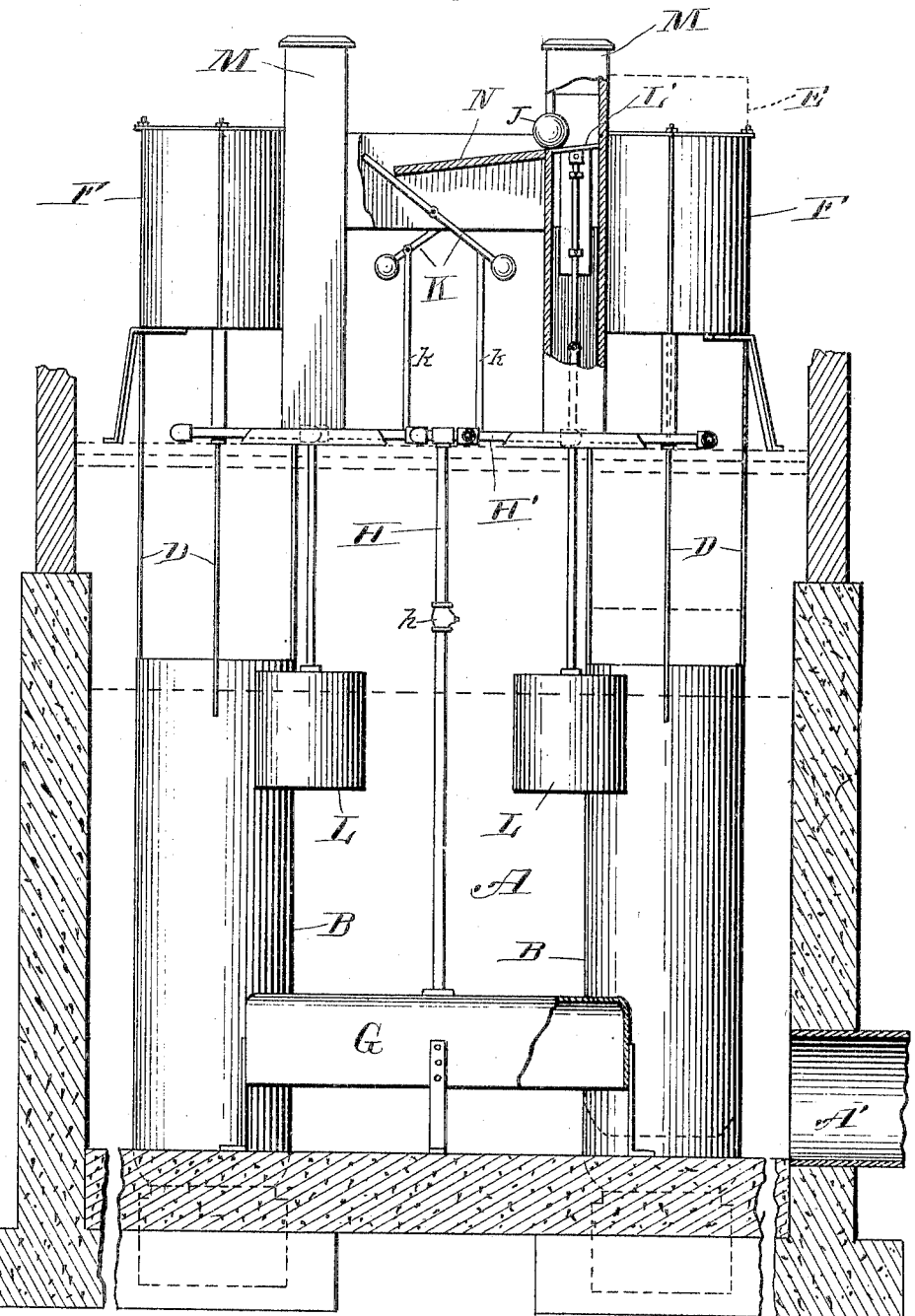

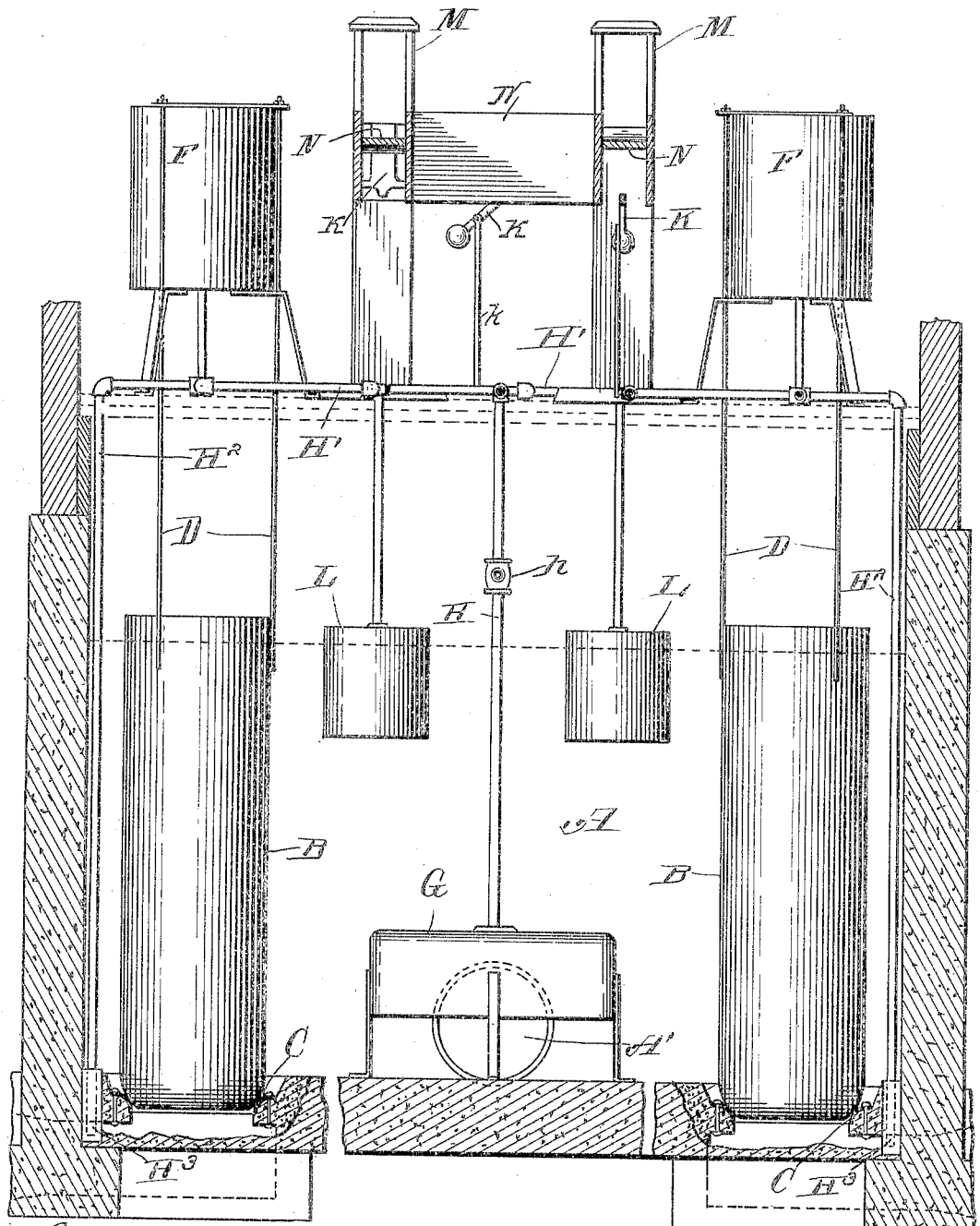

No. 793,963.

Patented July 4, 1905.

UNITED STATES PATENT OFFICE.

WILLIAM S. SHIELDS, OF CHICAGO, ILLINOIS.

LIQUID-CONTROLLER.

SPECIFICATION forming part of Letters Patent No. 793,963, dated July 4, 1905.

Application filed April 5, 1904. Serial No. 201,625.

*To all whom it may concern:*

Be it known that I, WILLIAM S. SHIELDS, a citizen of the United States, residing at Chicago, in the county of Cook and State of Illinois, have invented certain new and useful Improvements in Liquid-Controllers, of which the following is a specification.

The present invention relates to an automatic device for controlling the flow of liquid, producing its intermittent discharge upon or into a plurality of filter or contact beds; also, for discharging the contents of such contact-beds at fixed intervals either into secondary contact-beds or filters or to a final outlet.

The apparatus is particularly adapted for use in what is known as the "bacterial" systems of treating sewage; but I desire to have it understood that the invention is not limited to the use of the apparatus for any particular purpose. On the contrary, I reserve to myself the exclusive right to use the invention for any and all purposes for which it is adapted. Among these may be mentioned the purification of water-supplies.

For the sake of brevity the following description will be confined to the invention as embodied in the system for treating sewage. Such a system has what is known as a "primary" tank or receptacle, which receives the constant flow of sewage and may either store a portion of it, discharging it suddenly into secondary tanks or filters, or it may cause the flow to pass continuously to one filter for a fixed period of time and then automatically turn the flow to the next filter in rotation for a like period of time, and so on successively through the series. According to the present invention communication between the primary and secondary tanks or filters is controlled by valves, which may be of any desired construction. These valves are opened by the introduction of compressed air beneath a liquid-sealed bell or float so arranged and connected as to open the valve and hold it open until the compressed air is released. The air may be obtained from an air-dome placed in the bottom of a tank or vessel and compressed by the filling of such tank with water. In the case shown by the accompanying drawings the primary tank is used as a dosing-tank, and the air-dome is placed in the bottom of the tank; but I desire to have it understood that in this respect the invention is not limited to this form of construction, but, on the contrary, comprehends any arrangement in which an air-dome is gradually submerged, so that the air confined within it is compressed to a sufficient extent to open the controlling-valves and permit the liquid in the primary tank to escape; nor is it limited to an air-compressor of any particular construction, although I prefer to use a dome open at bottom and adapted to be submerged; nor is the invention in its broadest aspect limited to any particular form of device for receiving the air-pressure and converting it into valve motion; but I prefer to use a device constructed like an ordinary gasometer, consisting of a cup or vessel, in which is placed an inverted cup or bell so sealed with liquid contained in the outer cup or vessel that when the compressed air is admitted to the interior of the bell it will rise and remain raised until the contained air is released. This may be effected by weakening a seal in a trap in a vent-pipe so placed that when the tank has emptied the seal is forced and the air escapes, allowing the bell to fall and the valve to close; but in this respect the invention is not limited, nor is it limited to a valve of any particular construction; but for operating dosing-tanks I prefer to use a valve which is of uniform diameter from the valve-seat to a level above the high-water level of the tank, so that at no time will there be any downward pressure upon it, and I prefer to make this valve and its upward extension hollow.

The invention consists in the features of novelty that are hereinafter described.

In the accompanying drawings, which are made a part of this specification, Figure 1 is a plan view of an apparatus embodying the invention. Figs. 2 and 3 are sectional elevations thereof.

A represents the primary tank, and A' the inlet thereto. In the drawings I have shown the tank as having four outlets A², which may be supposed to lead to as many different filter-beds, and each of these outlets is controlled by a valve B. The lower portion of the valve, which contacts with the seat C, is tapered; but from the seat, or thereabout, the valve has a cylindrical extension of uniform diameter which extends upward to a level above the high-water level of the receptacle. Furthermore, the valve and its upward extension are hollow and open at both top and bottom, so that should any one of the valves fail to operate all of them would serve as overflow-pipes and permit the liquid to pass to the outlets $A^2$. Each of the valves is connected by suitable means, preferably hangers D, with an inverted cup or bell E, the bottom of which is open and submerged in a body of liquid confined in a tank F after the manner of an ordinary gasometer.

G is an air-dome which is located in the receptacle A near the bottom thereof. It is open at bottom and closed at all other sides, excepting that a pipe H leads from its top. This pipe has a check-valve $h$, which permits air expelled from the dome to pass it, but which prevents the return of air to the dome. From the pipe H branch pipes H′ lead to the several bells E, so that air expelled from the dome G may, under conditions hereinafter described, enter one or another of said bells. In each of these branch pipes is a valve I, which is under control of mechanism substantially such as is shown in Letters Patent No. 703,090, which were granted to me June 24, 1902. This controlling mechanism has a traveling weight J, preferably in the form of a sphere, which is adapted to act and be acted upon successively by mechanisms peculiar to each of the valves B, substantially in the manner described in the patent aforesaid and as briefly described hereinafter.

When all of the valves B are seated, all of the valves I will be held closed by the weighted levers K, attached to their stems. As the liquid rises in the receptacle A the air will be compressed in the air-dome G and will be confined therein until one of the valves I is opened. As the liquid approaches its highest level it will come in contact with all of the floats L and lift them. As they rise the inclined heads L′ will be moved upward in the boxes M, and the traveling weight also will be moved upward by the inclined head, on which it is for the time being resting. When the inclined head reaches its uppermost position, the weight will roll into the adjoining race N and down the inclined bottom thereof. Escaping from the inclined bottom, it will impinge against one arm of the lever K and move it in opposition to the weight carried by the other arm, thereby drawing upward upon a rod $k$, which is connected at one end to the lever $k$ and at the other end to an arm $i$, projecting from the stem of the corresponding valve I, whereby the valve will be opened, so as to permit the compressed air from the dome G to pass into the corresponding bell E. The pressure of the air within the bell will lift the corresponding valve B and permit the contents of the receptacle A to escape through the corresponding outlet $A^2$. As the level of the liquid falls the floats L will fall with it, and eventually the next succeeding inclined head L′ will pass to a level below the adjacent end of the race N and permit the weight to roll from the race onto it. The weight is then in condition to pass into the next succeeding race upon a recurrence of the operations just described. There will, however, be a considerable lapse of time before this recurrence takes place, because the floats have only a limited travel and will reach the lowest point of this travel before the receptacle has completely emptied itself. Meanwhile the bell E is held up by the air confined in it. On one side the air is confined by the check-valve $h$ and on the other side by a vent-pipe $H^2$. This vent-pipe is carried downward to a level below the bottom of the tank, and its lower end dips into a trap $H^3$, whereby it is sealed and whereby a hydrostatic column equal to the depth of the trap is constantly maintained. This trap is of such depth that it maintains about the submerged end of the pipe $H^2$ a hydrostatic column of sufficient height to support the bell E and valve B until the receptacle is completely discharged, whereupon the weight of the bell and valve will overcome the pressure of this hydrostatic column and expel enough air from the bell to permit the valve to seat.

What I claim as new is—

1. In a liquid-controller, the combination of a tank, a chamber in which air is compressed by the rising of the water in the tank, a valve for controlling an outlet, and means operated by the air compressed in said chamber, for opening the valve.

2. In a liquid-controller, the combination of a tank having an outlet, a valve for controlling said outlet, an air-dome open at bottom and adapted to be submerged, and means operated by the air compressed in the dome for opening said valve, substantially as described.

3. In a liquid-controller, the combination of a tank having an outlet, a valve for controlling said outlet, means whereby air is compressed by the rising of the liquid in said tank and means operated by the air thus compressed for opening said valve, substantially as described.

4. In a liquid-controller, the combination of a tank having an outlet, a valve for controlling said outlet, means whereby air is compressed by the rising of the liquid in said tank, mechanism adapted to be operated by the air thus compressed for opening the valve, and means including a float for controlling the passage of the compressed air to the valve-opening mechanism, substantially as described.

5. In a liquid-controller, the combination with a tank having an outlet, and a valve for controlling said outlet, of mechanism adapted to be operated by compressed air, for opening said valve, and means including a float operated by the rising of the liquid in the tank for conditioning the valve-opening mechanism to operate, substantially as described.

6. In a liquid-controller, the combination of a tank, an air-dome open at bottom and adapted to be submerged, float mechanism for controlling the escape of air from said dome, a valve, and means operated by the air compressed in the dome for opening said valve, substantially as described.

7. In a liquid-controller, the combination of a tank, an air-dome therein, means controlled by the rise and fall of the liquid in said tank for controlling the escape of air from said dome, a valve, and means operated by the air compressed in said dome for opening said valve, substantially as described.

8. In a liquid-controller, the combination of a tank having an inlet and an outlet, a valve for controlling the outlet, an air-dome in the tank, means controlled by the rise and fall of liquid in the tank for controlling the escape of air from the dome, and means operated by the air compressed in the dome for opening the outlet-valve, substantially as described.

9. In a liquid-controller, the combination of a tank, an air-dome therein, a sealed inverted cup or bell, a pipe for conveying air from the dome to the interior of the bell, and a valve operatively connected with the bell, substantially as described.

10. In a liquid-controller, the combination of a tank, an air-dome therein, a sealed inverted cup or bell, a pipe for conveying air from the dome to the interior of the bell, a sealed vent-pipe leading from the bell, and a valve operatively connected with the bell, substantially as described.

11. In a liquid-controller, the combination of a tank, an air-dome therein, a sealed inverted cup or bell, a pipe for conveying air from the dome to the interior of the bell, a vent-pipe leading from said bell, a liquid-sealed trap for controlling said vent-pipe and a valve operatively connected with said bell, substantially as described.

12. In a liquid-controller, the combination of a tank, a liquid-sealed bell, an air-compressor, a pipe for conveying air therefrom to the bell and a valve operatively connected with the bell, substantially as described.

WILLIAM S. SHIELDS.

Witnesses:
JAMES W. COX,
GEORGE C. HABERMEYER.